Patented Mar. 7, 1933

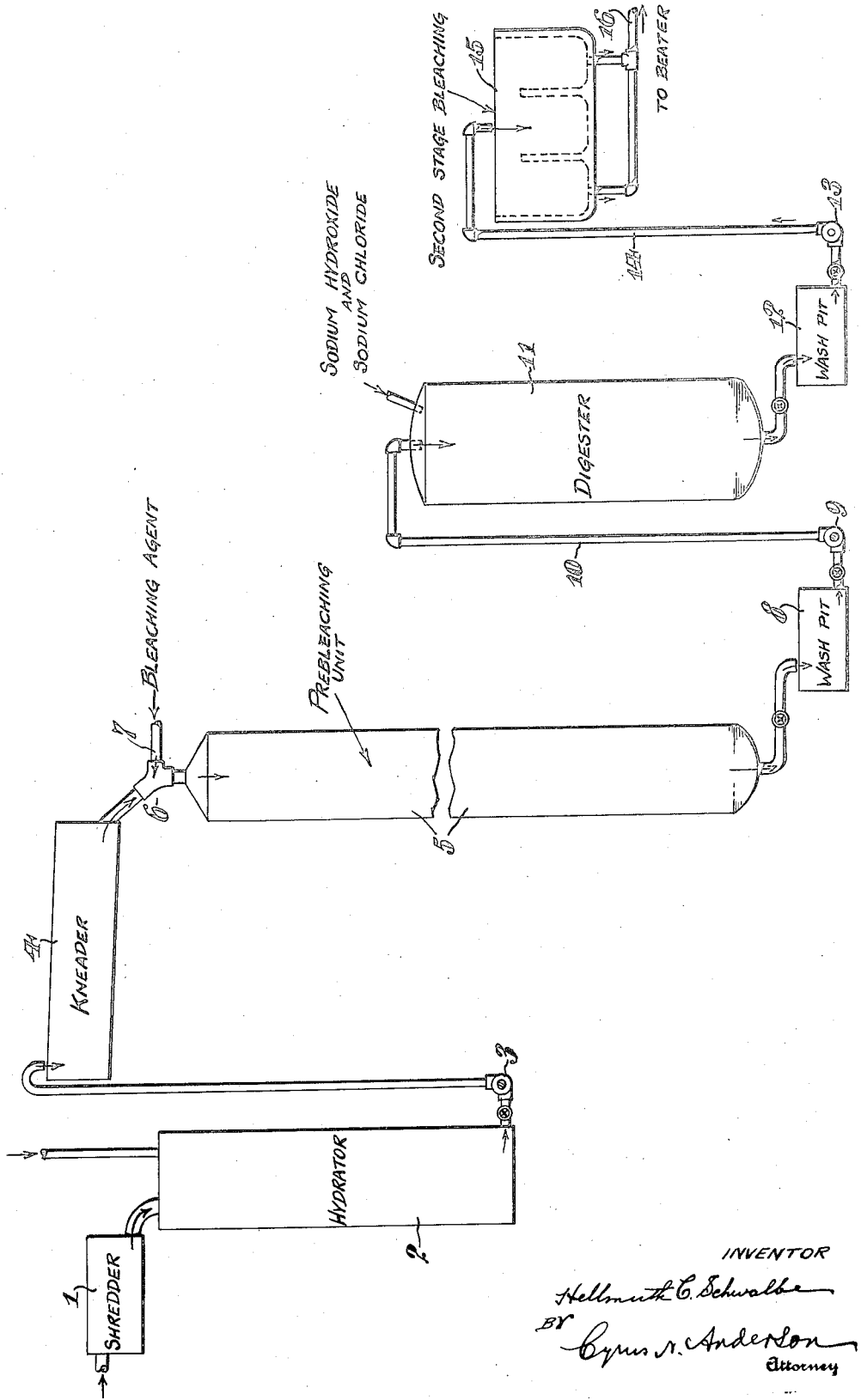

1,899,989

UNITED STATES PATENT OFFICE

HELLMUTH C. SCHWALBE, OF PHILADELPHIA, PENNSYLVANIA, ASSIGNOR TO DILL & COLLINS CO., OF PHILADELPHIA, PENNSYLVANIA, A CORPORATION OF PENNSYLVANIA

PROCESS OF TREATING CELLULOSE FIBER PULP

Application filed April 4, 1931. Serial No. 527,664.

For use in the manufacture of books, magazines, advertising and for other purposes wherein artistic printing is required to be employed a paper is needed which is of a quality such as heretofore has been available only by the use of the most expensive materials, such as rags, in the manufacture thereof. There are upon the market highly purified cellulose pulps suitable for use in the manufacture of such paper but they are too expensive to permit of their use in the manufacture of paper in large quantity or volume for use under circumstances requiring economy and cheapness. Such pulps sometimes are called alpha pulps. They have a percentage of alpha or resistant cellulose which may range from 93.5% to about 98% with beta and gamma cellulose and pentosan in correspondingly reduced percentages and having a low copper number. In the manufacture of such papers a very slow and progressive beating is required in order to produce a pulp or paper having maximum strength. The time required for the beating operation is about three times that required for the beating of ordinary bleached sulphite pulp. Unless such highly purified pulp is subjected to an adequate beating operation a poor paper is produced therefrom notwithstanding its purity and its high cost.

It is characteristic of highly purified pulp when subjected to an adequate beating operation and paper made therefrom that they have high folding capacity and tearing strength and are sufficiently durable to stand super-calendering or coating and super-calendering.

What is needed is a pulp and a paper having the characteristics of a highly purified pulp but which may be manufactured and supplied at a very much lower price than heretofore has been practical in connection with the highly purified pulps which have been known.

The general object of my invention is to provide a pulp having the characteristics of a highly purified pulp which has been subjected to adequate progressive beating action but which may contain resistant or alpha cellulose in percentages ranging from about 89% to not above 92%. In such case the percentages of beta and gamma cellulose and pentosan will be correspondingly increased.

It also is an object of the invention to provide a novel process for the treatment of ordinary unbleached sulphite, soda or sulphate (kraft) pulp in a way to produce therefrom a pulp having the characteristics indicated above as being required to produce a good paper but which is not so high in resistant or alpha cellulose as rag or other highly purified pulps.

A further object of the invention is to provide a process by the employment of which in the treating of the ordinary and well known cellulose fiber pulps a product is obtained wherein the percentage of resistant or alpha cellulose ranges from about 89% to not more than 92% with the percentages of beta and gamma cellulose and pentosan correspondingly increased, the beta and gamma cellulose being undamaged nor the fibers being shortened or otherwise degraded. It is essential in order that pulps may be supplied at relatively low cost that they may be produced without long and progressive beating as is required in the manufacture of the highly purified pulps containing resistant or alpha cellulose in percentages ranging from 93.5% to about 98%. The beating operation is an expensive one in the manufacture of paper and hence any process or method employed which is to effect any substantial reduction in the cost of manufacture must be such as to provide a product of the character desired without the necessity of long and progressive beating.

A still further object of my invention is to provide a process for the treating of cellulose fiber pulps which comprises as a step therein a preheating operation whereby the fibers are conditioned to more readily respond to the future treatment thereof. In that way the carrying out or practicing of the process is rendered very much cheaper.

Without attempting to further amplify the objects and purposes of the invention or to set the same forth in greater detail I shall now proceed to a detailed description thereof wherein further and other objects of the said invention will be set forth or will be made apparent. In describing the invention I shall refer to certain apparatus in order that the description of the process employed by me may be simplified but reference to such apparatus is for purposes of description and not by way of limitation as any suitable kind or form of apparatus may be employed for the performance of the process.

In the drawing I have shown diagrammatically and in elevation an apparatus which may be employed in the practicing of the process of the invention and in the description of the latter reference will be made to such apparatus.

In carrying out or practicing of the process the pulp is passed through or subjected to the action of a shredding device indicated at 1 and from the latter it is discharged into a hydrator 2 wherein it is subjected to a prebeating operation. The prebeating may be effected in what is known as a Fritz vertical hydrator, shown in the drawing, or in ordinary beaters, Jordans, or any other suitable beating apparatus. Care must be taken in the beating operation that the hydration or swelling of the fibers is effected with a minimum amount of shortening thereof. In other words, shortening of the fibers is to be avoided in the carrying out of my process to produce a cheap pulp and paper having the characteristics of highly purified pulp and paper produced therefrom.

The hydrated cellulose fiber pulp is discharged from the hydrator 2 and conveyed therefrom by means of a pump 3 to a kneader 4 or other suitable device from which it is discharged into a prebleaching means or unit 5. The construction and operation of the kneader are such as to effect hydration of the fibers rather than a shortening thereof. It has been found that the prebeating operation as above described effected before the bleaching is an essential feature of novelty in my new process. Without such prebeating the bleaching chemical does not readily penetrate the fiber. In other words, if the fiber is in a raw condition it does not permit ready penetration thereof by the bleaching gases or liquids. If the pulp is not prebeaten as described stronger concentrations of bleaching agents must be used in order to obtain sufficient bleaching. The use of such stronger concentration of bleaching agents results in damage to the non-alpha constituents of the fiber with the consequence that an inferior product is obtained. If, however, the pulp is prebeaten so that the fiber is hydrated or swollen and therefore soft and pliable then the bleaching may be much more easily accomplished and by the use of bleaching agents in much lower concentrated form.

It is advantageous that there be added to the raw pulp before the prebeating thereof in the hydrator 2 very small amounts of chemicals which are known as hydrating chemicals.

As above stated, the prebeaten fiber is discharged from the kneader 4 to a prebleaching unit 5. The material is transferred from the kneader 4 to the unit 5 through a pipe 6 into which is projected chlorine gas, a water solution of chlorine gas or a solution of sodium or calcium hypochlorite in water. These constitute bleaching agents. The bleaching agent is projected into the pipe 6 in a direction opposite that in which the prebeaten pulp is flowing to the unit 5. That insures good absorption and thorough mixing or intermingling of the bleaching agent with the pulp. The prebleaching unit 5 consists of a tank of tubular form, preferably cylindrical, and of preferably small diameter as compared with its height. The diameter may be approximately 5 feet while the height should be from 26 to 30 feet. The fiber in its passage through the prebleaching unit 5 is mixed with water, there being about 10 to 16 pounds of dry pulp to approximately 100 pounds of water. About one-third to one-half of the total chlorine employed as a bleaching agent in the entire process is introduced into the pipe 6 from a pipe 7 as indicated.

The force of gravity is depended upon to cause the fiber held or suspended in water to flow through the prebleaching unit 5 although a pump may be employed for pumping out any residue of pulp which may remain near the end of an operation.

By reason of the fact that the tubular member or tank 5 of the prebleaching unit is of small diameter as compared with its great height and of the further fact that the bleaching agent is thoroughly intermingled with the pulp and the water carrying the same the bleaching action is very efficient and is accomplished without injury to the fiber. It may be noted that a small percentage of the non-alpha cellulose constituents of the pulp is removed during the passage of the pulp through the preheating unit but not sufficient to cause any noticeable increase in the cost of manufacture. The prebleached pulp is discharged from the prebleaching unit into a wash pit 8 wherein it is washed in well known manner. Instead of the employment of a wash pit as shown the washing may be effected upon a vacuum filter or by any other means for that purpose which may be known. After having been washed the pulp is transferred by means of a pump 9 or by any other suitable means through a pipe 10 to a digester 11 where it is cooked. The pulp is discharged from the pipe 10 into the upper end of the digester. The pulp in the digester is subjected to the action of a mixture of caustic alkali and sodium chloride in approximately or substantially equal parts. The alkali may consist of sodium hydroxide. I prefer to employ the cell effluent of electrolytic cells which are employed in paper mills for the production of chlorine and sodium hydroxide. This effluent contains very nearly equal amounts of sodium hydroxide and sodium chloride and it is of the concentration necessary for the treating of the pulp.

The pulp with the mixture of caustic alkali and sodium chloride is cooked while in the digester 11 for a relatively short period, say for about one to three hours, at a pressure of from 10 to 20 pounds per square inch and at a corresponding temperature. By the treatment in the digester in the manner as stated the alpha cellulose constituent of the fiber is improved and slightly increased so that when discharged the pulp contains from about 89% up to 92% of alpha or resistant cellulose. The pulp, however, is fast beating, is harder than any known purified pulp, is high in tearing and in Mullen strength, has high folding capacity and a low copper number of about 1.5 to about 2.5. The percentage of beta and gamma cellulose fibers and of pentosan are greater than in the highly purified pulps heretofore known and which are employed when papers of highest grade are desired. Notwithstanding the increased percentages of the non-alpha constituents yet because of the way in which it has been treated as above described the pulp and the paper produced therefrom possess the desirable characteristics heretofore referred to as being embodied in and incident to highly purified pulp containing from 93.5% to 98% of alpha cellulose. By treating the pulp in accordance with my invention damaging of the non-alpha constituents of the fiber is avoided in consequence of which a pulp is produced having the characteristic qualities necessary to a pulp of high grade.

A small percentage of the non-alpha cellulose constituents is removed during the treatment in the digester but not in sufficient quantity to be noticeable. The pulp during its treatment in the digester is mixed with water, the amount of pulp, based on dry weight, being 15% to 20% of the amount of water. From the digester 11 the pulp is discharged into a wash pit 12 and from the latter is transferred by means of a pump 13 through a pipe 14 to an apparatus 15 wherein a second bleaching operation is effected. The apparatus indicated at 15 is that known as a "Bellmer" having reference to the designer thereof. The device suggested is like that disclosed on page 21 of section 9 of volume 3 of the publication entitled "The Manufacture of Pulp and Paper", published by McGraw-Hill Book Company, Incorporated, of New York. From the apparatus 15 the pulp after having been subjected to a second bleaching operation is transferred through a pipe 16 to a beater, not shown.

I have found in the treatment of pulp by the process invented by me that there is a resulting loss in the weight of the pulp of only about 15%, whereas in the processes known and heretofore employed in the manufacture of highly purified pulps the losses in weight of the cellulose fiber have ranged from 30% to 35%. It will be apparent from the foregoing that there are factors of advantage incident and due to my invention. The primary factor which results from other factors is that a high grade pulp having the characteristics of highly purified pulp heretofore known may be produced and put into condition for use at a much lower price than heretofore has been practical. This possibility is due in part to the fact that long and progressive beating is not required. By the employment of the process of my invention the beating may be accomplished rapidly and with little, if any, increased expense or cost as compared with the beating of the ordinary soda, sulphite or kraft pulps. A further important factor is that the treatment according to my invention does not result in the large percentage of losses which occur when the processes of treatment heretofore known are employed. A further factor and one which aids in reducing the cost of manufacture is that the non-alpha cellulose constituents are undamaged and are left in condition such that they not only do not lend deterioration to the quality of the pulp but on the contrary improve the character thereof. The percentage of beta cellulose contained in the product made in acordance with the process of my invention may range from about three and a half percent (3.5%) to about five percent (5%) and of gamma cellulose from about four and a half to about seven percent (4.5% to 7%). A small percentage of pentosan also is present.

By my invention I am enabled to produce a pulp for use in the manufacture of papers of high quality at a very much greatly reduced price as compared with the price of production of pulps of high grade according to the processes or methods heretofore known. This is of the greatest interest and advantage to the manufacturers of paper because it enables them to produce papers of high grade at a cost which will permit their use in large volume or quantity by those engaged in the manufacture of books, magazines, etc.

It will be understood that in the use of pulp produced in accordance with my invention it may be mixed with cellulose fiber pulps bleached in the usual way to produce a paper suitable for use as a book paper which is standard practice in the handling of the highly purified fibers as heretofore known.

Having thus described my invention what I claim and desire to secure by Letters Patent is:

1. The process of treating sulphite pulp which comprises as a step therein the prebeating thereof.

2. The process of treating sulphite pulp which comprises as steps therein the prebeating of the same and thereafter subjecting it to a prebleaching action.

3. The process of treating sulphite pulp which comprises as steps therein the prebeating of the same and thereafter subjecting it to a prebleaching action in the presence of a quantity of bleaching agent substantially less than that required for the complete bleaching treatment.

4. The process of treating sulphite pulp which comprises as steps therein the prebeating of the same, thereafter subjecting it to a prebleaching treatment and subsequently to a digesting treatment.

5. The process of treating sulphite pulp which comprises as steps therein the hydration thereof to effect swelling and softening of the fiber and thereafter subjecting it to a prebleaching treatment in the presence of a quantity of a bleaching agent insufficient to effect complete bleaching thereof.

6. The process of treating sulphite pulp which comprises as steps therein the prehydration thereof to effect swelling and softening of the fiber, transferring the hydrated pulp to a prebleaching unit, discharging a bleaching agent into the hydrated pulp during its passage to the said unit and in a direction opposite to that in which the pulp is moving, causing the said pulp to travel a relatively great distance through the prebleaching unit to effect bleaching thereof without shortening or otherwise damaging the fiber, and thereafter subjecting the same to a cooking action at a pressure ranging from ten to twenty pounds per square inch in the presence of a causticizing agent.

7. The process of treating cellulose fiber pulp which comprises as steps therein the prehydration thereof, transferring the prehydrated fiber to a prebleaching unit, discharging a quantity of a bleaching agent into the pulp during its passage to the said prebleaching unit insufficient to effect complete bleaching thereof, thereafter cooking the said pulp at a pressure which may range from about ten to twenty pounds at corresponding temperatures in the presence of an alkali hydrate and sodium chloride in substantially equal parts, and thereafter subjecting the cooked pulp to a final bleaching action.

8. The process of treating cellulose fiber pulp which comprises as steps therein the prehydration thereof to cause swelling and softening of the fiber, thereafter subjecting the same to a prebleaching treatment in the presence of a quantity of a bleaching agent equal to from about one-third to one-half of the total quantity of bleaching agent necessary to effect complete bleaching of the pulp and thereafter cooking the said prebleached pulp at a pressure which may range from about ten to twenty pounds per square inch in the presence of sodium hydroxide and sodium chloride in approximately equal parts.

9. The process of treating cellulose fiber pulp which comprises as steps therein the prehydration thereof to cause swelling and softening of the fiber, thereafter subjecting the same to a prebleaching treatment in the presence of a quantity of a bleaching agent equal to from one-third to one-half of the total quantity of bleaching agent necessary to effect complete bleaching of the pulp, thereafter cooking the said prebleached pulp at a pressure which may range from about ten to twenty pounds per square inch in the presence of sodium hydroxide and sodium chloride in approximately equal parts, and thereafter subjecting the pulp to a second bleaching treatment.

In testimony that I claim the foregoing as my invention I have hereunto signed my name this 31st day of March, 1931.

HELLMUTH C. SCHWALBE.